May 20, 1930.   O. J. SUNDSTRAND   1,759,069
CASH REGISTER OR SIMILAR MACHINE
Filed Aug. 4, 1923    4 Sheets-Sheet 1

May 20, 1930. O. J. SUNDSTRAND 1,759,069
CASH REGISTER OR SIMILAR MACHINE
Filed Aug. 4, 1923 4 Sheets-Sheet 3

Inventor
O. J. Sundstrand

May 20, 1930.  O. J. SUNDSTRAND  1,759,069
CASH REGISTER OR SIMILAR MACHINE
Filed Aug. 4, 1923   4 Sheets-Sheet 4
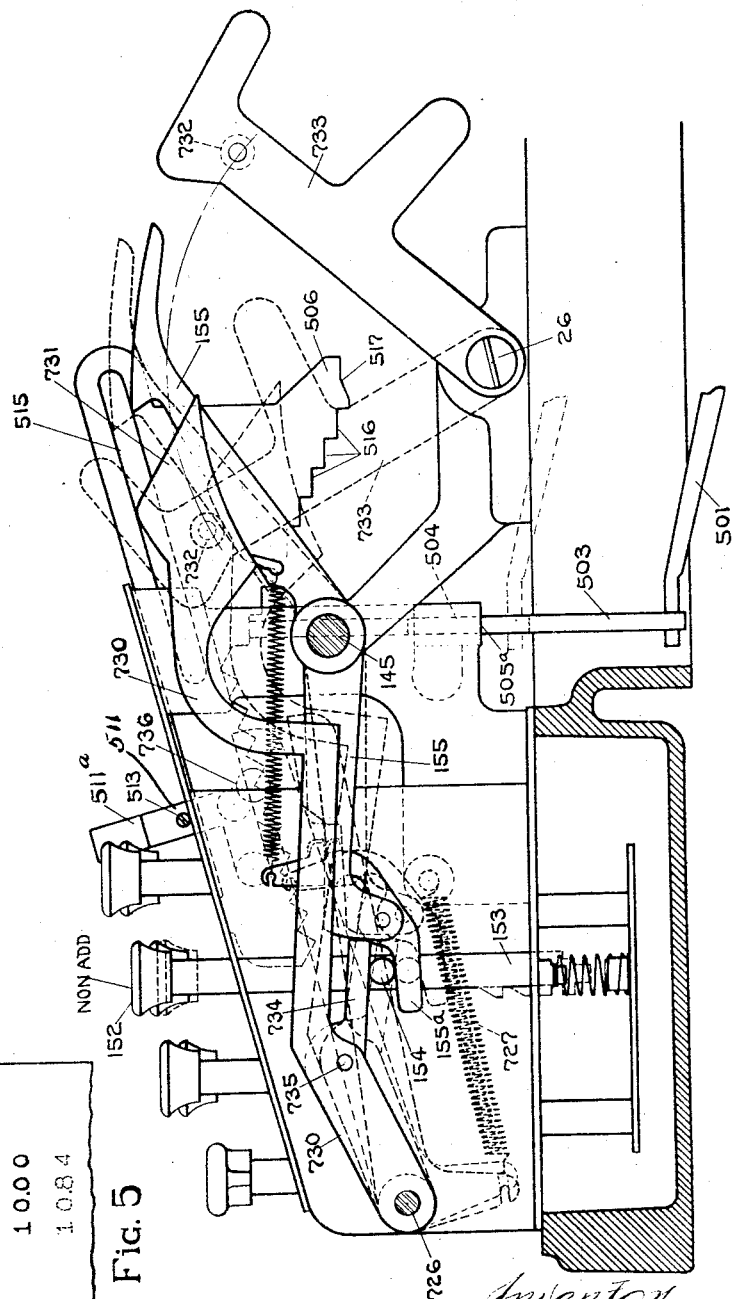

Patented May 20, 1930

1,759,069

UNITED STATES PATENT OFFICE

OSCAR J. SUNDSTRAND, OF ROCKFORD, ILLINOIS, ASSIGNOR, BY MESNE ASSIGNMENTS, TO SUNDSTRAND CORPORATION, OF WILMINGTON, DELAWARE, A CORPORATION OF DELAWARE

CASH REGISTER OR SIMILAR MACHINE

Application filed August 4, 1923. Serial No. 655,557.

The present invention has special reference to cash registers of the class in which a self-contained adding and listing machine is removably positioned upon a casing containing a cash drawer, means being provided for unlatching the cash drawer through operation of the adding and listing machine. For the purpose of explaining the manner in which the present invention may be practically applied, I have herein disclosed the invention as embodied in a cash register of the character above outlined, but it should be understood that the invention is not limited to machines of this particular type.

One of the objects of the invention is to provide means for making a record which shall distinguish between cash sales, charge sales, money received on account, money paid out, goods returned, etc.

Another object is to provide means for printing clerk symbols and department symbols upon the record tape opposite the individual amounts.

Another object is to make the unlatching of the cash drawer conditional upon the making of a suitable record, as for example, a record of the symbol of the clerk who operated the machine at the time the drawer was opened.

A further object of the invention is to provide means whereby it shall be possible automatically to record the amount of money paid out, or the value of goods returned, or the value of goods charged to the customer's account without having such amounts accumulated in the adding mechanism, the total accumulated in the machine thus representing money received.

Figure 1:
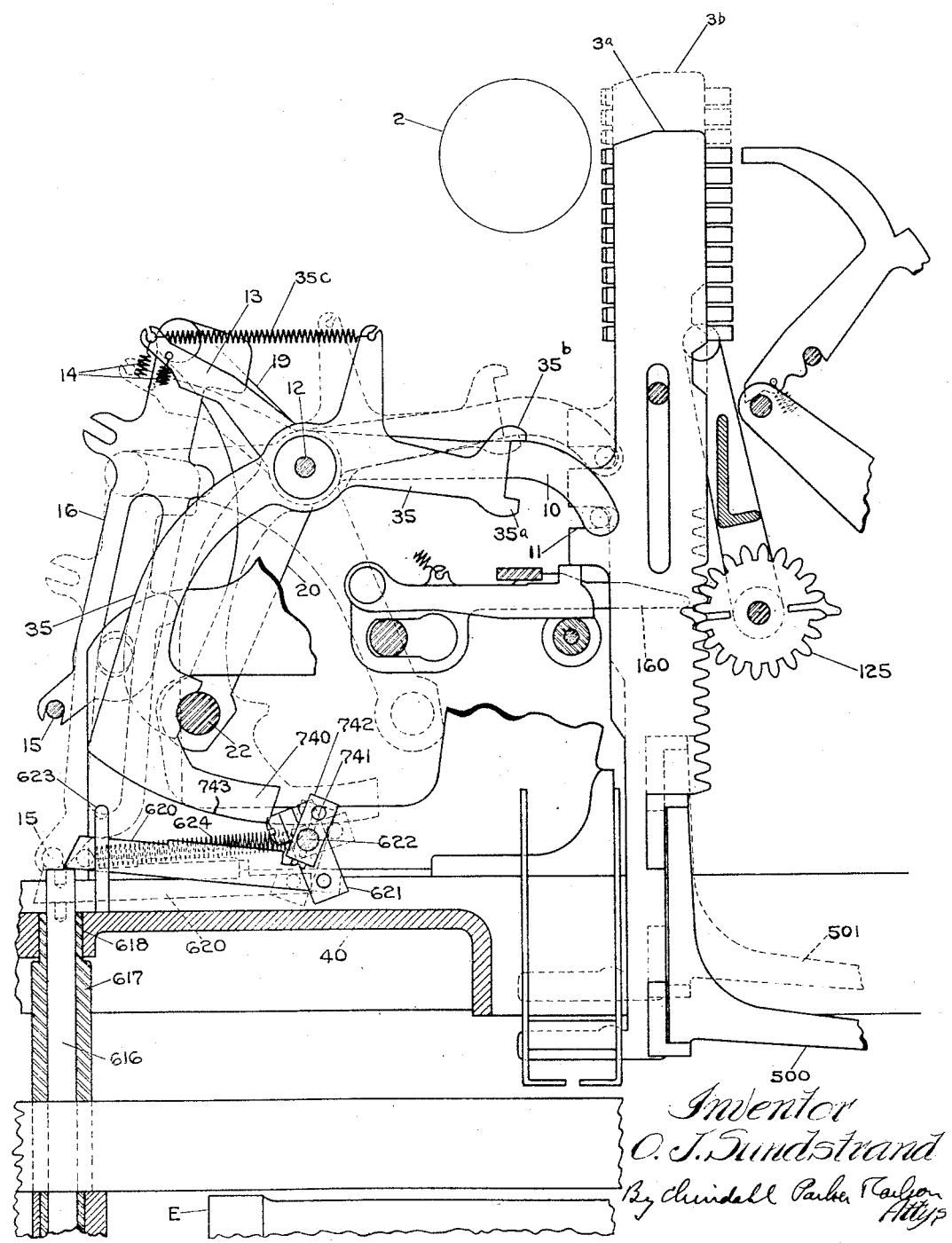
Figure 2:
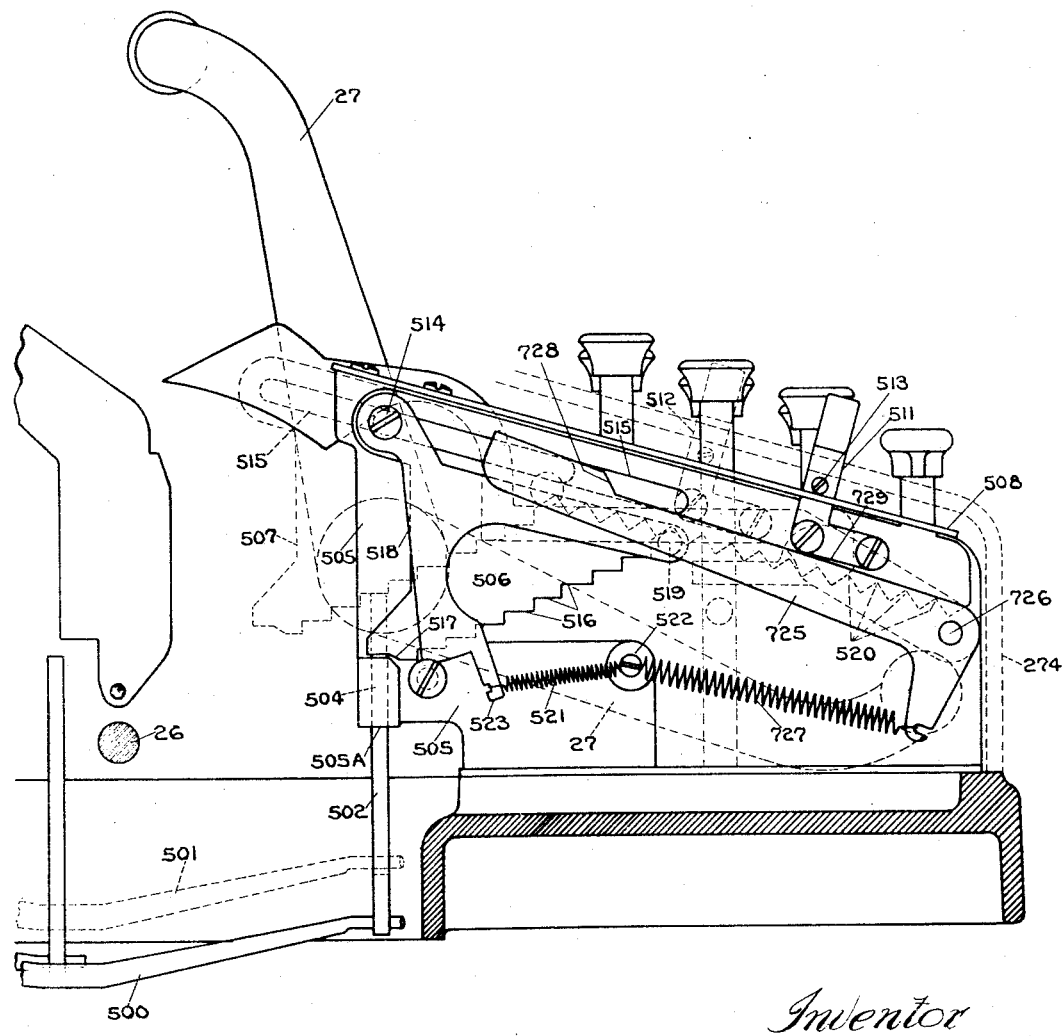
Figures 3, 4:
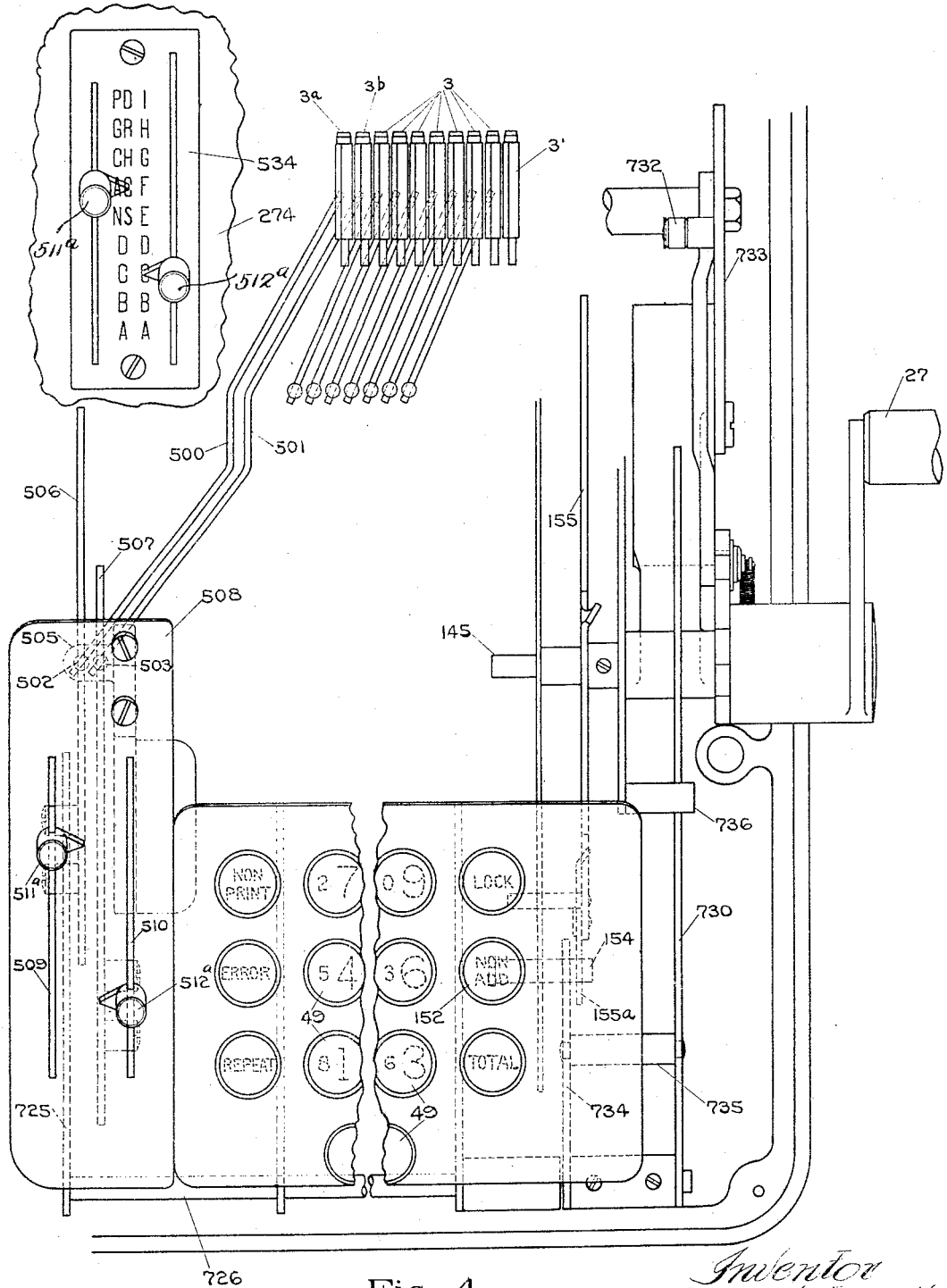

In the accompanying drawings, Figs. 1 and 2, taken together, constitute a longitudinal vertical sectional view of a machine embodying the features of this invention, various parts being omitted for the sake of clearness of disclosure. Fig. 3 illustrates the manually operable means for setting the machine to make various records. Fig. 4 is a fragmental plan view of the machine. Fig. 5 represents a specimen of work done on the machine. Fig. 6 is a fragmental view of the handle side of the machine.

I have shown in the drawings a machine substantially similar to the one disclosed in the Sundstrand Patent No. 1,198,487, dated September 19, 1916, although it will be understood that the invention is capable of application to other forms of computing machines. Since the construction and mode of operation of the Sundstrand adding machine are well known, it will not be necessary to describe those parts of the present construction which are similar to those of the Sundstrand machine.

The means for supporting the sheet or tape upon which the printing is to be done may be of any suitable character, a platen 2 being indicated in the drawings. 3 are the vertically reciprocatory type bars for printing the items and totals, and 3' is the sign-printing type bar. At the left-hand side of the group of type bars 3 and 3' are two type bars $3^a$ and $3^b$ which are generally similar to the type bars 3 and are provided with the special characters which it is desired to print, as, for example, letters or numerals constituting the symbols for departments or clerks, the abbreviations for paid out, goods returned, charged to account, received on account, etc. The symbols provided in the present embodiment of the invention are indicated in Fig. 3.

For the sake of simplicity of manufacture, the type bars $3^a$ and $3^b$ are herein shown as provided with ten type, although the uppermost type is not used. Similarly, said type bars are shown as having rack teeth, although they have no adding function and do not mesh with the adding pinions.

The means for vertically reciprocating each type bar 3, $3^a$ and $3^b$, may be of any desired nature, as, for example, an arm 10 (Fig. 1) carrying a roller that lies in a notch 11 in the type bar. The arm 10 is pivotally mounted on a fixed shaft 12. Rigid with the arm 10 is an arm 13 which is yieldingly connected through a pair of helically coiled contractile springs 14 to a rod 15. The latter is carried by two side members 16 which are guided for approximately vertical movement. (Only one of the side members 16 is shown in the present drawings). Pivoted to the upper ends of the side members 16 are arms 19 which are pivotally mounted on the shaft 12. Integral with the arms 19 are two arms 20 which carry a rod 22. The end portions of the rod 22 are connected by means not herein shown to the main rock shaft 26. The shaft 26 is arranged in a suitable manner to be rocked by means of a handle or crank 27.

When the operator pulls the handle 27 forward the shaft 26 is caused to rock in the direction to draw the rod 22 forward and move the side members 16 and the rod 15 downward. The movement of the rod 15 is yieldingly transmitted through the springs 14 and the arms 13 and 10 to such of the type bars 3, $3^a$ and $3^b$ as are at liberty to rise. When the operator releases the handle upon the completion of the forward stroke, means of any ordinary or suitable character return the handle to its normal position, as shown in full lines in Fig. 2. The means for lowering those type bars which were raised in the forward stroke of the handle comprises levers 35 pivotally mounted on the shaft 12, there being one such lever for each type bar 3, $3^a$ and $3^b$. Rigid with each lever 35 are two lugs $35^a$ and $35^b$ adapted to bear against the adjacent arm 10. A spring $35^c$ connected to the arm 13 tends to hold the lug $35^a$ in contact with the arm 10. During the back stroke of the handle, the rod 22 is moved against those levers 35 which are associated with the type bars that were raised in the forward stroke of the handle. When the rod 22 moves the lower ends of said levers 35 rearwardly, the springs $35^c$ or the lugs $35^b$ restore the type bars to their normal (lower) position.

The means for selectively limiting upward movement of the type bars $3^a$ and $3^b$ to present the desired characters at the printing line comprises arms 500 and 501, respectively, connected to the lower portions of said type bars and extending forwardly therefrom. To the forward ends of the arms 500 and 501 are attached upwardly extending pins 502 and 503, respectively, which are guided for vertical movement in guide openings 504 formed in a bracket 505 attached to the base of the machine. Means is provided for manually interposing stops in the path of upward movement of the pins 502 and 503. Herein said means comprises two plates 506 and 507 located in the vertical planes of the pins 502 and 503, respectively, and slidably mounted beneath a stationary guide plate 508. In said guide plate are slots 509 and 510 (Fig. 4) through which extend stems 511 and 512 provided with keys or heads $511^a$ and $512^a$, respectively, for convenience in moving said stems through the slots. The stems 511 and 512 are rigidly attached to the forward portions of the plates 506 and 507, respectively. Screws or pins 513 extending through the stems 511 and 512 just above the plate 508 serve to prevent downward displacement of the forward portions of the plates 506 and 507. The rear portions of the plates 506 and 507 are guided upon a stud 514 fixed in the bracket 505 and extending through slots 515 in said plates.

In order that the plane of movement of the stems 511 and 512 shall be approximately parallel with the adjacent surface of the enclosing casing 274, the plate 508 occupies an inclined position, as shown in Fig. 2.

The lower edge of the rear portion of each plate 506, 507 is stepped to provide stops to limit upward movement of the pins 502 and 503. These stops are sufficient in number to provide for positioning the desired number of characters. In the present instance, the type bar $3^a$ carries nine type adapted to print "A", "B", "C", "D", "NS", "AC", "CH", "GR" and "PD", respectively, while the type bar $3^b$ is provided with nine type adapted to print the letters "A" to "I", inclusive. Each plate 506, 507 has eight stops 516 and a stop or dwell 517 corresponding to the initial or normal position of the stems 511 and 512. The means for limiting the upward movement of the type bars $3^a$ and $3^b$ when "PD" and "I" are to be printed, consists, in this instance, of the lower side of the bracket portion $505^a$, the arms 500 and 501 stopping against said surface.

The means for yieldingly holding the plates 506 and 507 in adjusted position may partake of various forms. For example, for each plate there may be a latch or detent 518 (Fig. 2) pivoted on the stud 514 and having a roller stud 519 that engages V-shaped notches 520 in the lower edge of the plate. The roller stud 519 is pressed against the notched lower edge of the plate by a coiled contractile spring 521 anchored at 522 and attached to an arm 523 on the detent.

The hammer mechanism associated with the type bars 3, 3', $3^a$ and $3^b$ may be of any suitable construction, as, for example, that embodied in the Sundstrand adding machine. Reference may be made to my application Serial No. 434,242, filed December 31, 1920, (now Patent No. 1,626,889, dated May 3rd, 1927) for a disclosure of the hammer mechanism of the Sundstrand machine.

A plate 534 (Fig. 3) is attached to the casing 274 of the machine in position to overlie the plate 508. The casing 274 and the plate 534 have slots registering with the slots 509 and 510, so that the stems 511 and 512 may extend through the casing and the plate 534. Opposite the positions determined by the notches 520, the plate 534 is marked to denote the various characters that may be printed by means of the type bars $3^a$ and $3^b$.

As shown in Fig. 4, the stems 511 and 512 are located close to the keyboard formed of the numeral keys 49, and at the left-hand side thereof, so that the operator may conveniently and rapidly place the stems 511 and 512 in the required positions.

The adding mechanism may be of any suitable nature, as, for example, that disclosed in the Sundstrand Patent No. 1,198,487. Such a mechanism is indicated herein by the adding pinion 125 (Fig. 1) and the transfer dog 160.

The machine may be provided with any suitable mechanism for preventing accumulation, as, for example, the non-add mechanism embodied in the Sundstrand adding machine and shown in the Sundstrand Patent No. 1,198,487. I have deemed it necessary to show in the present drawings only a portion of the non-add mechanism, that is to say, a non-add key 152, the stem 153 of which has a pin 154 overlying a finger 155ª on the forward end of a lever 155, said lever being pivotally mounted at 145.

When a clerk has occasion to record cash paid out or the value of goods returned or the value of goods charged to the customer's account, it is necessary to operate the non-add mechanism to prevent such an amount from being added to the total already accumulated in the adding mechanism as said total represents cash received. In order to obviate the necessity of remembering to operate the non-add mechanism on such occasions, I have provided means controlled by the slide 506 whereby the non-add key 152 will be automatically depressed in the operation of the handle 27 whenever the slide 506 has been set for printing the symbols for money paid out or goods returned or a charge sale. The means herein shown for this purpose comprises an arm 725 (Fig. 2) fixed upon one end of the rock shaft 726. 727 (Fig. 2) is a contractile spring tending to hold the arm 725 in normal position, as shown in said figure. On the free end of the arm 725 is a cam surface 728 adapted to be engaged by a part 729 secured to the plate 506 when said plate is slid into position for the printing of the symbols for cash paid out, goods returned or charge sale. On the other end of the rock shaft 726 is fixed an arm 730 (Fig. 6) having a cam surface 731 adapted to be engaged by a roller stud 732 on a crank arm 733 which is rigid with the main rock shaft 26. An arm 734 (Figs. 4 and 6) is fixed upon the rock shaft 726 and may be secured to the arm 730 by means of a rivet 735, as herein shown. The free end of the arm 734 overlies the stud 154. The spring 727 normally holds the arm 730 up against a stop 736. When in its normal position, the free end of the arm 730 is above the path of movement of the roller stud 732, but when the stop plate 506 is slid into position for printing the symbol for a charge sale or goods returned or money paid out, the part 729 depresses the arm 725 sufficiently to bring the cam surface 731 (Fig. 6) in the path of movement of the roller stud 732; consequently when the handle 27 is pulled forward, said roller stud depresses the arms 730 and 734, thereby depressing the non-add key and causing the lever 155 to be held in such position as to prevent accumulation of the items being printed. As a result, the value of the goods returned, or the amount to be charged to the customer's account, or the amount of money about to be paid out, together with the appropriate symbol "GR", "AC" or "PD", as the case may be, will be recorded on the tape, but the amount will not be added to the total previously accumulated in the adding mechanism.

The means for latching the cash drawer E in the closed position may be of any desired character, and hence has not been illustrated herein. Reference may be made to application Serial No. 492,243, filed by me on August 15, 1921, (now Patent No. 1,568,300) for a disclosure of one form of latch which may be employed. It is sufficient here to state that the latch is arranged to be disengaged from the drawer by means including a plunger 616 (Fig. 1) which is vertically reciprocable in a guide 617. The upper portion of the guide 617 extends into an opening 618 formed in the base 40 of the adding and listing machine. Thus the guide 617 serves to locate the adding and listing machine in operative relation to the cash drawer. The plunger 616 is arranged to be depressed by power derived from the rod 15, but in order that the plunger shall be depressed only when one of the stop plates 560, 507 (herein, the plate 507) has been positioned for the making of a record, I provide a member which is arranged to be interposed between the rod 15 and the plunger 616 whenever such a record is being made, said rod depressing said member and the plunger 616 and thus causing the cash drawer to be unlatched. In the present embodiment, the member referred to consists of a block 620 (Fig. 1) pivoted at its forward end to an arm 621 fixed upon a rock shaft 622. The rear end of the block 620 rests at all times upon the upper end of the plunger 616. A fixed guide loop 623 prevents lateral displacement of the block 620. A coiled contractile spring 624 normally holds the block 620 forward far enough to be out of the path of the rod 15, as shown in full lines in Fig. 1. On the lower end of the lever 35 for the type bar 3ᵇ is a member or heel 740 arranged to engage a pin 741 on a crank arm 742 carried by the shaft 622. On the lower end of said lever 35 is a concentric or dwell surface 743 adapted to ride over the pin 741. When the stop plate 507 has been shifted into position to permit the type bar 3ᵇ to rise into position to make an imprint upon the tape, the movement of the type bar 3ᵇ into position to make such imprint will cause the heel 740 to engage the pin 741 and thereby project the block 620 rearwardly into the path of the descending rod 15, whereby the cash drawer will be unlatched.

The mechanism just described for unlatching the cash drawer is claimed generically in my application Serial No. 505,095, filed October 3, 1921 (now Patent No. 1,726,775).

The machine may be provided with the mechanism ordinarily present in the Sundstrand adding machine for enforcing a blank or spacing stroke of the handle 27 before a sub-total or a final total may be printed. The machine also may be provided with the usual two-color ribbon mechanism whereby the totals are printed in a distinctive color, as, for example, red. Said two-color ribbon mechanism is so arranged that when the machine is clear and there is nothing set up on the keyboard, operation of the handle 27 causes the ribbon to be shifted into position for printing from the red field.

A sample of the work which may be done on the machine is shown in Fig. 5. Clerk C in department A has recorded a cash sale consisting of three items of twenty-nine cents, thirty-seven cents and eighteen cents, respectively. A blank stroke having first been taken, the subtotal of eighty-four cents has been printed. (The fact that the subtotal has been printed in red is indicated in the drawing by the use of dotted lines.)

Assuming now that clerk A in department C desires to pay out one dollar: He first sets the slides 506 and 507 in position for printing the letters "C" and "A" and then operates the handle 27 to print said letters, the subtotal being printed incidentally. The clerk then adjusts the slide 506 into position to print the symbol "PD", then sets up the amount of "1.00" by means of the keyboard, and again operates the handle 27 to record the transaction, thus printing the symbol "PD", his symbol "A", the amount (1.00) and the sign indicating that the amount has not been accumulated, the non-add key being automatically depressed as hereinbefore explained.

Clerk F in department D having occasion to record the fact that goods to the value of twenty-four cents have been returned, he sets the slides 506 and 507 in position to print the letters "D" and "F", operates the handle 27 to print said letters, and then shifts the stop plate 506 into position to print the symbol "GR", after which he sets up the amount on the keyboard and operates the handle 27, thereby printing the symbol "GR", his symbol "F", the value of the goods returned, and the non-add sign.

Clerk D in department A having sold goods to the value of forty-nine cents which are to be charged to the account of the customer, he sets the slides 506 and 507 in position to print letters "A" and "D", operates the handle 27 to print said letters, and then shifts the stop plate 506 into position to print the symbol "CH", after which he sets up the item ".49", operates the handle 27 to print the symbol "CH", his designating symbol "D", the amount of the sale and the non-add sign.

If clerk H in department D receives ten dollars to be applied to the account of a certain customer, he first adjusts the stop slides 506 and 507 into position for printing the letters "D" and "H", and then operates the handle 27 to effect the printing of said letters, after which he adjusts the slide 506 to print the symbol "AC" for money received on account and sets up the amount on the keyboard, following which he operates the handle 27 to print said symbol, his own designating symbol and the item of "10.00".

If desired, the total of the cash received, that is to say "10.84" may be printed, as indicated in Fig. 5.

In practice, the clerks would make suitable pencil memoranda on the tape to record the names of the persons to whom money was paid out, or who returned goods, or to whom goods were charged, or who made payments on account, the platen being manually rotated to space the items sufficiently to provide room for such notations.

It will be apparent that the invention herein disclosed provides means whereby the clerk is compelled to make some record, as, for example, a record of his designating letter or number, before he can unlatch the cash drawer.

Inasmuch as the non-add mechanism is arranged to be automatically operated when amounts are being recorded which should not be added, the operator is relieved of the necessity of making any special manipulation of the machine to ensure non-accumulation of such items, and accumulation of such items through inadvertence is prevented.

I claim as my invention:

1. A cash register having, in combination, a type-carrier having a plurality of symbol type, a manually-settable member having a plurality of stops to limit movement of said type-carrier into printing positions, means to move said type carrier to printing position, a cash drawer, and means operable in the movement of said type carrier to unlatch said drawer.

2. The combination of a casing, a cash drawer in the casing, a printing mechanism above the drawer, said mechanism including a vertically movable rod 15, a drawer-unlatching plunger, a block arranged to be interposed between said rod and said plunger to render said rod effective to unlatch the drawer, said printing mechanism including a type bar adapted to print symbols, and means actuated in the movement of the type bar for interposing said block between said rod and said unlatching plunger.

3. The combination of a casing, a cash drawer in the casing, a printing mechanism above the drawer, a drawer-unlatching member, a block arranged to be interposed between said member and said mechanism to render said mechanism effective to unlatch the drawer, said printing mechanism including a type bar, and means actuated in the movement of said type bar for interposing said block between said mechanism and said unlatching member.

4. The combination of a type bar, a lever for moving said type bar, means for moving said lever, a cash drawer unlatching member, and a block, said lever being arranged to interpose said block between the lever moving means and the drawer unlatching member to render the lever moving means effective to move said member.

5. The combination of a type bar, a lever for moving said type bar, a handle and connections for moving said lever, a cash-drawer unlatching member, and a normally retracted block, said lever being arranged to advance said block into position between the lever-moving means and the drawer-unlatching member to render the lever-moving means effective to move said member.

6. A cash register having, in combination, a type carrier having a plurality of type, a member having a plurality of stops to limit movement of the type carrier, a key for shifting said member to selected position, means to move said type carrier to printing position, a cash drawer, and means operable in the movement of said type carrier to unlatch said drawer.

7. A cash register having, in combination, a type carrier having a plurality of symbol type, a member having a plurality of stops to limit movement of said type carrier, a key for shifting said member to selected position, means including a pivoted handle to move said type carrier to printing position, a cash drawer, and means operable in the movement of said type carrier to printing position to unlatch said drawer.

8. An adding and recording machine having, in combination, a keyboard, a non-add key at one side of the keyboard, a lever at that side of the keyboard arranged to depress said key, a handle for driving the machine, a member moving with the handle for operating the lever, mechanism to record the nature of transactions (as, for example, disbursements, cash receipts, etc.), means at the other side of the keyboard to set said recording mechanism, and an arm arranged to be moved by said setting means, said arm being connected to said lever.

9. An adding and recording machine having, in combination, a keyboard, a non-add key at one side of the keyboard, a lever arranged to depress the non-add key, a handle for driving the machine, a member moving with the handle for operating the lever, mechanism to record the nature of transactions (as, for example, disbursements, cash receipts, etc.), and means at the other side of the keyboard to set said recording mechanism, said setting means being arranged to move said lever into position for actuation by said member.

10. An adding and recording machine having, in combination, a non-add key, a lever arranged to depress the key, a handle for driving the machine, a member moving with the handle for operating the lever, mechanism to record the nature of transactions (as, for example, disbursements, cash receipts on account, etc.), and means to set said recording mechanism, said setting means being arranged to move said lever into position for actuation by said member.

11. The combination of printing mechanism comprising a type carrier, having a plurality of type, a manually shiftable member having a plurality of stops to limit the movement of said type carrier, a non-add key, a handle for driving the machine, and means arranged to be set by said member and to be actuated in the movement of said handle for depressing the non-add key.

12. An adding and recording machine having, in combination, means to record the nature of transactions (as, for example, disbursements, receipts on account, etc.), means to set said mechanism, a non-add key, a handle for driving the machine, and mechanism operable by the handle to depress the non-add key, the last mentioned mechanism being controlled by said setting means.

13. The combination of printing mechanism comprising a type carrier having a plurality of type, a manually shiftable member having a plurality of stops to limit the movement of said type carrier, and a non-add key under the control of said member.

14. An adding and recording machine having, in combination, means including a handle and a type bar to record the nature of transactions (as, for example, disbursements, receipts on account, etc.), said handle being yieldably connected to the type bar, manually operable means to limit movement of said type bar, under the action of said handle, and non-add mechanism automatically controlled by said manually operable means.

15. An adding machine having, in combination, a non-add key, an oscillatory handle for driving the machine, and means actuated in the forward stroke of said handle for depressing the non-add key.

16. An adding machine having, in combination, non-add mechanism arranged for manual control, and a handle for driving the machine, said handle being arranged to actuate the non-add mechanism.

17. An adding machine having, in combination, a handle for driving the machine, and non-add mechanism automatically actuated in the forward stroke of the handle.

18. The combination of a printing mechanism, said mechanism including a vertically movable member, a part to be moved, a block arranged to be interposed between said member and said part to render said member effective to move said part, a spring normally holding the block in ineffective position, said printing mechanism including a type bar, a lever connected to said type bar to move the latter, said lever having a heel, and means arranged for the engagement by said heel for interposing said block between said member and said part.

19. The combination of a printing mechanism including a vertically movable rod 15, a part to be moved, a block arranged to be interposed between said rod and said part to render said rod effective to move said part, a shaft, an arm fixed on said shaft, said block being connected to said arm, a member movable to and fro in the operation of the printing mechanism, and a second arm on said shaft arranged to be engaged by said member to interpose said block between said rod and said part to be moved.

20. The combination of a printing mechanism including a vertically movable member, a part to be moved, a block arranged to be interposed between said member and said part to render said member effective to move said part, a shaft, an arm fixed on said shaft, said block being connected to said arm, a member movable to and fro in the operation of the printing mechanism, and a second arm on said shaft arranged to be engaged by the second-mentioned member to interpose said block between the first-mentioned member and said part to be moved.

In testimony whereof, I have hereunto affixed my signature.

OSCAR J. SUNDSTRAND.